July 1, 1969

J. C. GIBBONS 3,452,950

VERTICAL REPLENISHMENT SYSTEM

Filed Sept. 18, 1967

INVENTOR
JOHN C. GIBBONS

BY *Hughes, Rothwell, Mion, Zinn & Macpeak*

ATTORNEYS

United States Patent Office 3,452,950
Patented July 1, 1969

3,452,950
VERTICAL REPLENISHMENT SYSTEM
John C. Gibbons, 36 Hazelhurst St., St. Dartmouth,
Nova Scotia, Canada
Filed Sept. 18, 1967, Ser. No. 668,481
Int. Cl. B64c 1/22, 1/24; B64d 9/00
U.S. Cl. 244—137         8 Claims

ABSTRACT OF THE DISCLOSURE

A system for delivering supplies between a ship and a hover craft such as a helicopter or the like wherein a platform, capable of being raised and lowered between said ship and said hover craft, is positively guided along a constant tension cable detachably secured between said ship and said hover craft.

Background of the invention

This invention relates broadly to the transfer of material to or from an aircraft of the rotor-sustaining or hovering type such as a helicopter, and a platform mounted on land or on the deck of a ship. It is very difficult to maintain a helicopter in a stable position above a target due to the presence of cross winds, updrafts and downdrafts in the vicinity of the helicopter. These problems are complicated even further when the target platform is mounted on the deck of a ship which is subjected to a constant rolling and pitching motion.

Ordinarily a load carrying sling or platform is lowered from the helicopter on cable means which are controlled by means of a power winch on board the helicopter. In the presence of strong cross winds it is almost impossible to lower the load carrying platform directly along a vertical line extending between the target platform and the helicopter. The cargo platform may tend to swing back and forth beneath the helicopter in such a manner as to cause the load thereon to shift and topple off the platform. Such a swinging movement also presents a very dangerous situation with respect to personnel stationed adjacent the target platform for purposes of securing the cargo platform as it is lowered from the helicopter. Furthermore a sudden downdraft might cause the cargo platform to slam into the target platform with such a force as to severely damage the cargo platform and the cargo thereon. When the cargo is allowed to swing freely beneath the helicopter the shifting forces present a serious control problem in handling the helicopter thereby endangering the lives of the personnel on the helicopter.

Even if the air is relatively calm thereby allowing the direct vertical descent of the cargo platform from the helicopter, if the target platform is mounted on the deck of a ship which is being tossed about by the waves it is very difficult if not impossible to properly align the cargo platform with the target platform thereby giving rise to the same difficulties and dangers enumerated above.

It is well known in the art to utilize a cable detachably connected to the helicopter and a constant tension winch means on the target platform in order to obtain a high degree of accuracy and safety in the landing operation of the helicopter. A patent showing such a system is the patent to Stewart et al., 3,303,807, granted Feb. 14, 1967.

The present invention is directed to a vertical replenishment system whereby a cargo platform may be lowered from the helicopter to a target platform along a constant tension cable mechanism similar to that shown and described in the above mentioned patent to Stewart et al. The present invention thereby provides a vertical replenishment system which is suitable for use under all weather conditions and enable the replenishment of ships underway in a safe, fast and accurate manner.

The vertical replenishment system in the present invention provides the positive control of the cargo platform at all times by maintaining the cargo platform in positive contact with the constant tension cable extending between the helicopter and the target platform.

Summary of the invention

The present invention provides a vertical replenishment system for use between a helicopter and a land based target platform as well as a ship based target platform. The vertical replenishment system comprises a constant tension cable and winch means mounted on said target platform, means on said helicopter for releasably engaging one end of said cable means whereby said winch means will maintain a constant tension on the cable when it is connected to said helicopter means, cargo carrying means, means for raising and lowering said cargo carrying means between said target platform and said helicopter, and connecting means between said cargo carrying means and said cable means to stabilize said cargo carrying means as it is raised and lowered between said target platform and said helicopter.

Detailed description of the invention

Figure 1:
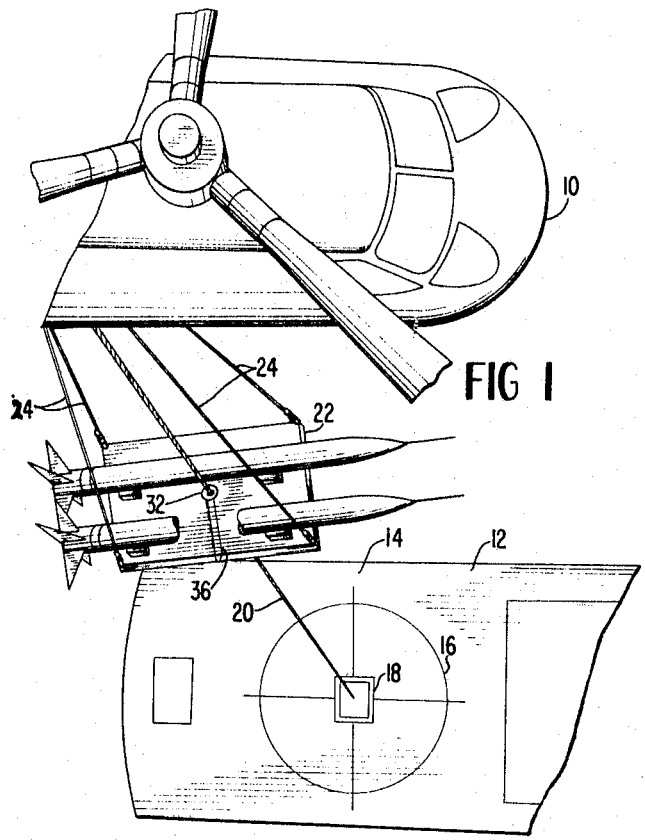
FIG. 1 is a top plan perspective view showing the vertical replenishment system of the invention.

Turning now to FIG. 1 a helicopter 10 is shown in a position wherein the helicopter is hovering above and to one side of a ship 12 having a large flat rear deck 14 provided with suitable target means 16 thereon. A helicopter hold down and securing device 18 is shown on the deck 14 of the ship 12 and is similar in all respects to the helicopter hold down and securing device shown and described in the patent to Stewart et al., 3,303,807. A cable 20 extends from the hold down and securing device 18 to the underside of the helicopter where it is secured in the same manner in which the cable 15 of Stewart et al. is secured to the helicopter. The hold down and securing device 18 is capable of maintaining a constant tension on the cable 20 such that the cable 20 will extend between the helicopter and the device 18 along a generally straight path.

A cargo carrying platform 22 is provided with cables 24 secured to each corner of the platform 22. The opposite ends of the cables 24 are secured at their opposite ends to a winching system (not shown) which is mounted on the helicopter 10. The winching system may be of any desired form and since the system does not form a part of the present invention it is not deemed necessary to show the details of such a system.

Figure 2:
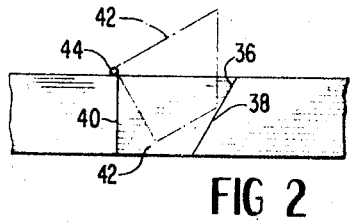
FIG. 2 is a side elevational view of the cargo carrying platform showing the cable retaining block member in the closed position and partially opened position.
Figure 5:
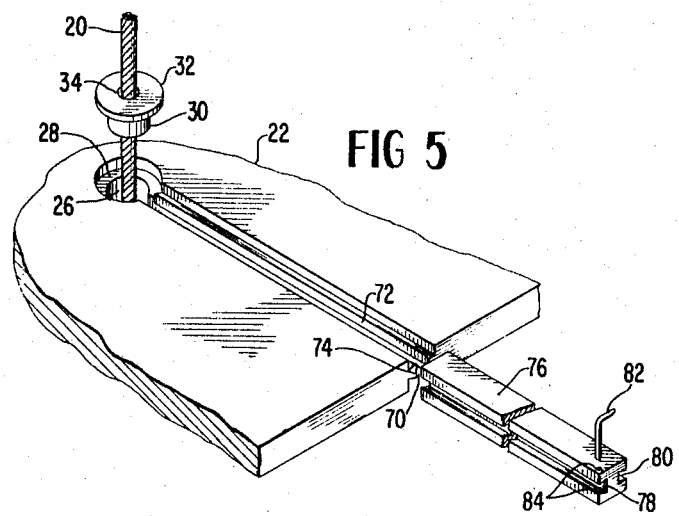
FIG. 5 is a partial perspective view of the cargo carrying platform showing a modified form of cable guiding means and cable retaining means.

As shown in FIGS. 1 and 5 the cargo platform 22 is provided with a hole 26 extending substantially through the center of the platform. The hole 26 is provided with an enlarged counter bore 28 for the reception of a guide ring 30 having an enlarged flange 32 thereon. The main cylindrical body portion of the ring 30 is received within the hole 26 and the flange 32 fits flush within the counter bore 28. The guide ring 30 is provided with a central bore 34 through which the cable 20 extends. A slot 36 having a width smaller than the diameter of the guide ring 30 but larger than the diameter of the cable 20 extends from the hole 26 to the external peripheral edge of the platform 22. The slot 36 may be provided with a bevelled edge 38 and a straight edge 40 opposed to each other. An elongated latching block 42 having side edges complementary to the edges 38 and 40 of the slot 36 may be hinged at 44 to the upper surface of the platform 22. When the latching block 42 is disposed in the position shown in solid lines in FIG. 2 the block will completely fill the slot thereby retaining the cable 20 within the central hole 26 while providing the platform with a relatively flat smooth unbroken upper surface. The elongated block 42 also tends to impart a degree of rigidity to the platform 22 in the area of the slot 36.

In the operation of the device when it is desired to dispose the cable within the guide hole 26 as shown in FIG. 1 for the purpose of guiding the supply platform 22 along the cable 20 between the target platform 14 and the helicopter 10 it is only necessary to pivot the block member 42 to a position enabling the insertion of the cable 20 through the slot 36 to the central hole 26. The guide ring 30 may or may not be used but if it is utilized it is necessary to mount the guide ring or sleeve 30 on the cable 20 prior to connecting a cable 20 to the underside of the helicopter 10. If the guide sleeve 30 is utilized the sleeve 30 is then inserted into the hole 26 and since the diameter of the sleeve 30 is wider than the width of the slot 36 the cable 20 cannot be removed through the slot 36. The block 42 is then swung back into the closed position filling the slot 36 to provide a smooth support surface on a platform 22. The guide sleeve 30 may be of any suitable material which will resist the abrating action and/or reduce the friction caused by the cable 20 passing through the hole 34. A suitable antifriction material would be Teflon or the like. The guide sleeve 30 prevents the cable from wearing the platform 22 and the guide sleeve may be replaced when necessary without replacing the entire platform.

Figure 3:
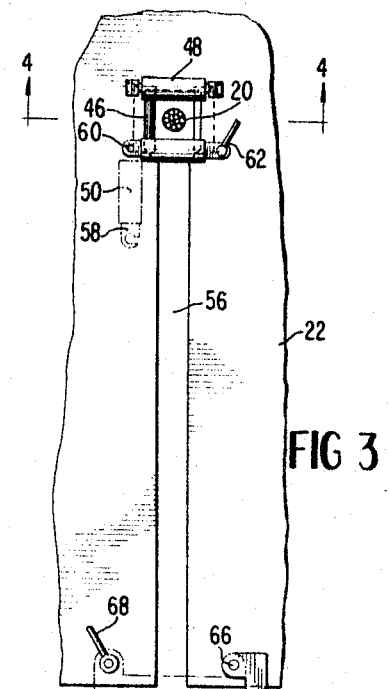
FIG. 3 is a partial top plan view of the cargo carrying platform showing one form of cable guiding means and a cable retaining means.
Figure 4:
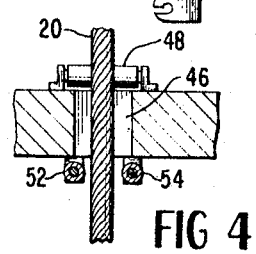
FIG. 4 is a sectional view along the line 4—4 of FIG. 3.

A modified guiding and retaining arrangment for the cable 20 with respect to the platform 22 is shown in FIGS. 3 and 4. In FIG. 3 the cable 20 is shown passing through a rectangular hole 46 and is adapted to bear against a first pair of rollers 48 and 50 disposed at opposite sides of the hole 46 on the upper side of the platform and a second pair of rollers 52 and 54 disposed on opposite sides of the hole on the underside of the platform 22 perpendicular to the first set of rollers 48 and 50. The four rollers 48, 50, 52 and 54 reduce the friction caused by the cable 20 passing through the hole 46 and prevent the cable 20 at the edge of the hole 46 from wearing each other. The four rollers may be mounted in any suitable brackets for free rotation. The slot 56 is formed in the platform 22 and extends from the hole 46 to the outer edge of the platform 22. The roller 50 is rotatably journaled on a bracket 58 which is pivotably mounted on the platform 22 at 60 for movement between a position wherein the roller 50 extends across the slot 56 and a position permitting the passage of the cable 20 through the slot 56. Any suitable latch means 62 may be provided for cooperation with the member 50 to retain it in a cable guiding position. A stabilizing bar 64 is pivotally mounted to the platforms 22 and 66 and is adapted to extend across the slot 56 and be latched to the platform on the other side of the slot by a suitable latching mechanism 68. When the stabilizing bar 64 is in the last position across the slot 56 the edges of the slot 56 are prevented from flexing relative to each other thereby providing a stronger cargo carrying platform.

A modified form of slot filler is shown in FIG. 5 wherein the edges of a slot 70 extending from the essential hole 26 to the edge of the platform 22 are provided with opposed tongue members 72 and 74 having bevelled edges. A cable retaining filler block 76 is provided with grooves 78 and 80 on opposite sides thereof having bevelled edges complementary to the bevelled edges on the tongues 72 and 74. The block 76 may be slid into the slot 70 to completely fill the slot to provide a smooth upper surface on the platform 22 and to stabilize the edges of the platform adjacent the slot 70. The block 76 may be retained within the slot 70 by means of a pin member 82 which is adapted to extend through aligned holes 84 in the block 76 and a hole (not shown) in the tongue 74 adjacent the end thereof.

The various cable guiding and retaining arrangements set forth above may be used interchangeably with each other and with various other cable guiding and retaining arrangements. The shape of the platform 22 may vary considerably depending upon the particular cargo being carried thereby and the means for slotably retaining the cargo carrying means relative to the taut cable may take any desired form. For example, if a simple passenger sling were utilized for transferring a passenger from the helicopter to the ship or vice versa it would only be necessary to utilize a short cable having snap rings on both ends for securement to the passenger sling and to the cable.

Obviously many modifications and variations of the present invention are possible in the light of the above teachings. It is therefore to be understood that within the scope of the appending claims, the invention may be practiced otherwise than as specifically described.

What is claimed is:

1. A vertical replenishment system for transferring cargo between a hovering aircraft and a target platform on the earth surface comprising cable means having one end thereof releasably secured to said aircraft, means mounted on said platform and connected to the other end of said cable means, cargo-carrying platform means, means for raising and lowering said cargo-carrying platform means between said target platform and said aircraft, and connector means between said cable means and said cargo-carrying platform means for guiding said cargo-carrying means along said cable means including hole means located through said platform remote from the edges thereof for the passage of said cable means therethrough, antifriction means disposed about said cable means adjacent said hole means and slot means through said cargo-carrying platform means extending between said hole means and the edge of said platform to facilitate the placement and removal of said cable means within said hole means.

2. A vertical replenishment system as set forth in claim 1 wherein said means mounted on said platform is a constant tension winch means adapted to maintain a constant tension on the cable extending between said aircraft and said target platform.

3. A vertical replenishment system as set forth in claim 1 wherein said antifriction means is comprised of a guide sleeve loosely surrounding said cable means and detachably received within said hole to prevent withdrawal of said cable means through said slot means.

4. A vertical replenishment system as set forth in claim 1 further comprising filler means adapted to substantially close said slot means to provide a relatively smooth upper surface on said cargo-carrying platform and to strengthen said cargo-carrying platform.

5. A vertical replenishment system as set forth in claim 1 wherein said antifriction means are comprised of a plurality of rollers journaled adjacent the edges of said hole means, one of said roller means being positioned to extend across said slot means and mounted for pivotal movement to selectively open or close said slot means.

6. A vertical replenishment system as set forth in claim 5 further comprising latching bar means pivotably mounted adjacent said slot means at the edge of said platform and means for releasably securing said latching bar means in a position spanning said slot means to effectively close said slot means and stabilize the edges of said slot means relative to each other.

7. A vertical replenishment system as set forth in claim 4 wherein said filler means is comprised of an elongated block member pivoted along one edge to an edge of said slot means for pivotable movement into and out of said slot means.

8. A vertical replenishment system as set forth in claim 4 wherein said filler means is comprised of an elongated block member, complementary tongue and groove means disposed on opposite edges of said slot and said elongated block member for guiding and holding said block member within said slot means.

References Cited

UNITED STATES PATENTS

| | | | |
|---|---|---|---|
| 2,471,544 | 5/1949 | Ring | 244—115 |
| 2,874,855 | 2/1959 | Rees | 214—14 |
| 3,064,829 | 11/1962 | Winfrey et al. | 214—14 |
| 3,303,807 | 2/1967 | Stewart et al. | 114—43.5 |

MILTON BUCHLER, *Primary Examiner.*

THOMAS W. BUCKMAN, *Assistant Examiner.*

U.S. Cl. X.R.

214—14